(12) United States Patent
Park et al.

(10) Patent No.: US 6,704,581 B1
(45) Date of Patent: Mar. 9, 2004

(54) MOBILE TELECOMMUNICATION SYSTEM AND METHOD FOR PERFORMING HANDOFF BETWEEN ASYNCHRONOUS BASE STATION AND SYNCHRONOUS BASE STATION

(75) Inventors: Jae-Hong Park, Ichon-shi (KR); Chong-Won Lee, Ichon-shi (KR); Yu-Ro Lee, Ichon-shi (KR); Ho-Geun Lee, Ichon-shi (KR)

(73) Assignee: Hyundai Electronics Industry Co. (KR)

( * ) Notice: Subject to any disclaimer, the term of this patent is extended or adjusted under 35 U.S.C. 154(b) by 653 days.

(21) Appl. No.: 09/707,151

(22) Filed: Nov. 6, 2000

(30) Foreign Application Priority Data

Nov. 13, 1999 (KR) ......................................... 1999-50402
Nov. 13, 1999 (KR) ......................................... 1999-50403
Dec. 15, 1999 (KR) ......................................... 1999-57757

(51) Int. Cl.[7] .............................................. H04M 1/00
(52) U.S. Cl. ................ 455/553.1; 455/432.1; 455/436; 455/444; 455/552.1; 370/331; 370/332; 370/335; 370/350
(58) Field of Search ............................. 455/432.1, 436, 455/444, 552.1, 553.1; 370/331, 332, 335, 350

(56) References Cited

U.S. PATENT DOCUMENTS

| | | | | |
|---|---|---|---|---|
| 5,533,014 A | * | 7/1996 | Willars et al. ............... | 370/335 |
| 5,594,718 A | * | 1/1997 | Weaver et al. .............. | 370/331 |
| 5,949,771 A | | 9/1999 | DeClerck et al. ........... | 370/331 |
| 5,999,814 A | | 12/1999 | Cuffaro et al. .............. | 455/436 |
| 6,018,662 A | | 1/2000 | Periyalwar et al. ......... | 455/442 |
| 6,018,667 A | * | 1/2000 | Ghosh et al. ................ | 455/502 |
| 6,021,122 A | | 2/2000 | Tiedemann, Jr. ............ | 370/331 |
| 6,035,199 A | | 3/2000 | Barnett ........................ | 455/448 |
| 6,061,337 A | | 5/2000 | Light et al. .................. | 370/331 |
| 6,070,075 A | | 5/2000 | Kim ............................. | 455/437 |
| 6,097,953 A | | 8/2000 | Bonta et al. ................. | 455/436 |
| 6,101,175 A | | 8/2000 | Schorman et al. .......... | 370/331 |
| 6,157,631 A | * | 12/2000 | Rohani ........................ | 370/342 |
| 6,185,429 B1 | * | 2/2001 | Gehrke et al. .............. | 455/502 |
| 6,201,802 B1 | * | 3/2001 | Dean ........................... | 370/350 |
| 6,246,673 B1 | * | 6/2001 | Tiedemann et al. ......... | 370/333 |
| 6,353,412 B1 | * | 3/2002 | Soliman ...................... | 342/387 |
| 6,363,252 B1 | * | 3/2002 | Hamalainen et al. ....... | 455/436 |
| 6,438,117 B1 | * | 8/2002 | Grilli et al. ................. | 370/331 |
| 6,456,606 B1 | * | 9/2002 | Terasawa ..................... | 370/331 |
| 6,456,858 B1 | * | 9/2002 | Streter ...................... | 455/552.1 |
| 6,469,995 B1 | * | 10/2002 | Voyer et al. ................. | 370/331 |
| 6,493,332 B1 | * | 12/2002 | Hirade ......................... | 370/342 |
| 6,498,933 B1 | * | 12/2002 | Park et al. ................... | 455/436 |
| 6,526,039 B1 | * | 2/2003 | Dahlman et al. ........... | 370/350 |
| 6,567,666 B2 | * | 5/2003 | Czaja et al. ................. | 455/442 |
| 6,571,099 B1 | * | 5/2003 | Kim et al. ................... | 455/442 |
| 6,594,242 B1 | * | 7/2003 | Kransmo ..................... | 370/331 |
| 6,597,674 B1 | * | 7/2003 | Obuchi et al. .............. | 370/331 |
| 6,597,911 B1 | * | 7/2003 | Kransmo ..................... | 455/436 |
| 2002/0037726 A1 | * | 3/2002 | Czaja et al. ................. | 455/442 |

OTHER PUBLICATIONS

"Interworking between GSM and PDC through IC cards", Y.Nodera et al., Jun. 1995, IEEE, P761–765.*
"Fast cell search algorithm in DS–CDMA mobile radio using long spreading codes", K.Higuchi et al., 1997, IEEE, p1430–1434.*

* cited by examiner

Primary Examiner—Nay Maung
Assistant Examiner—Sujatha Sharma
(74) Attorney, Agent, or Firm—Baker Botts LLP (57) ABSTRACT

A mobile telecommunication system for performing a handoff from an asynchronous communication system to a synchronous communication system includes: at least one asynchronous base station; at least one synchronous base station neighboring to the asynchronous base station, wherein the synchronous base station transmits channel signals; at least one dual-mode mobile station for selectively communicating with the synchronous base station and the asynchronous base station; and a reception unit, coupled to the asynchronous base station, for receiving and decoding the channel signals to transmit decoded signals to the asynchronous base station, wherein the asynchronous base station transmits the decoded signals to the dual-mode mobile station, thereby performing a handoff operation.

35 Claims, 10 Drawing Sheets

MOBILE TELECOMMUNICATION SYSTEM AND METHOD FOR PERFORMING HANDOFF BETWEEN ASYNCHRONOUS BASE STATION AND SYNCHRONOUS BASE STATION

FIELD OF THE INVENTION

The present invention relates to a mobile telecommunication system; and, more particularly, to a mobile telecommunication system and a method for performing a handoff from an asynchronous base station such as W-CDMA system to a synchronous base station such as 2G system based on IS-95 and 3G system based on IS-2000.

DESCRIPTION OF THE PRIOR ART

Generally, a mobile telecommunication system includes a synchronous communication system and an asynchronous communication system. The synchronous communication system operates in synchronization with a master clock provided by a global positioning system (GPS), and the asynchronous communication system operates without regard to the master clock. Furthermore, the synchronous communication system performs a data interface or a data transmission on the basis of interim standard (IS) protocols such as IS-95 and IS-41, and the asynchronous communication system performs a data interface or a data transmission on the basis of a universal mobile telecommunication system (UMTS) terrestrial radio access (UTRA) standard.

As the number of users is rapidly increasing and a demand on multi-media is rising high, a mobile telecommunication system is required which is capable of transmitting and receiving various types of information. For satisfying that requirement, an international telecommunication union (ITU) has suggested an international mobile telecommunication-2000 (IMT-2000) system as a next-generation mobile telecommunication system.

In network developments of the IMT-2000 system, there are four network interface architectures as follows:

1) dual-mode mobile station operating in a synchronous mode—synchronous radio network—synchronous core network (ANSI-41 network);
2) dual-mode mobile station operating a synchronous mode—synchronous radio network—asynchronous core network (GSM-MAP network);
3) dual-mode mobile station operating in an asynchronous mode—asynchronous radio network—asynchronous core network (GSM-MAP network); and
4) dual-mode mobile station operating in an asynchronous mode—asynchronous radio network—synchronous core network (ANSI-41 network).

FIGS. 1A to 1D are views showing network interface architectures of IMT-2000 system. In the drawings, the dual-mode mobile stations 10 are a mobile station that can selectively interface with the synchronous communication system and the asynchronous communication system according to a type of the radio networks.

An Air-interface between the dual-mode mobile station operating in the asynchronous mode and the asynchronous radio network employs an asynchronous communication Air-interface protocol, and an A-interface between the asynchronous radio network and the synchronous core network employs a 3 generation interoperability specification (3G-IOS) protocol.

Figure 1A:
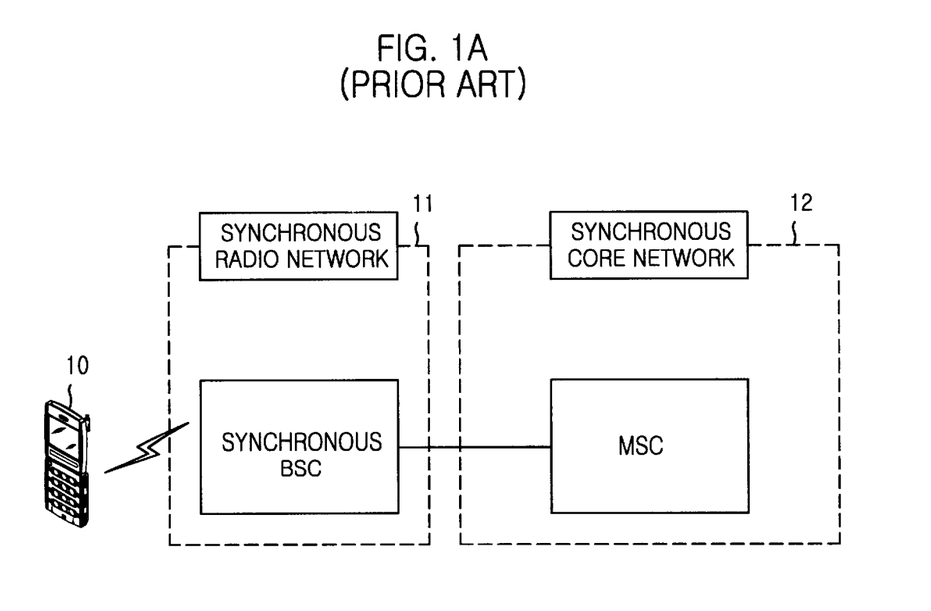
FIGS. 1A to 1D are views showing network interface architectures of IMT-2000 system.
Figure 1B:
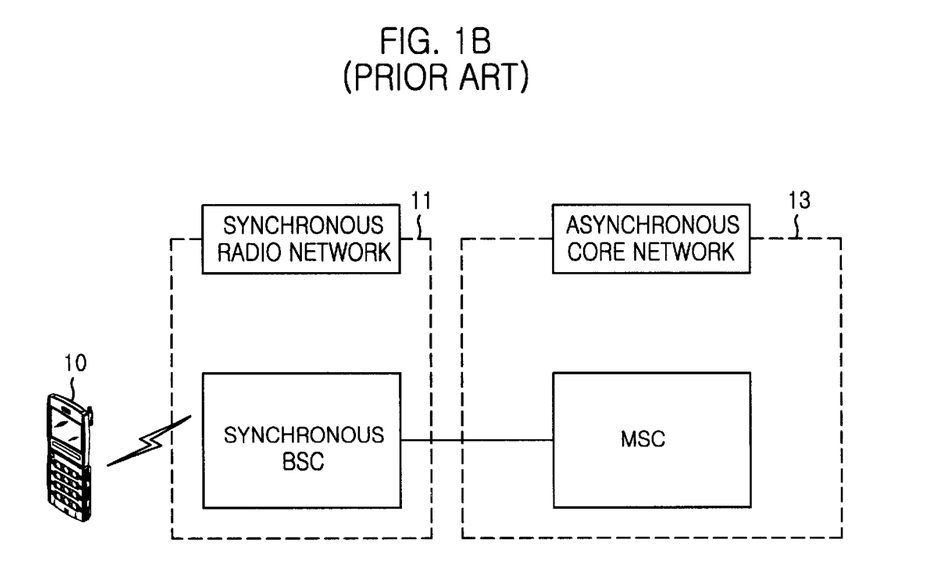
Figure 1C:
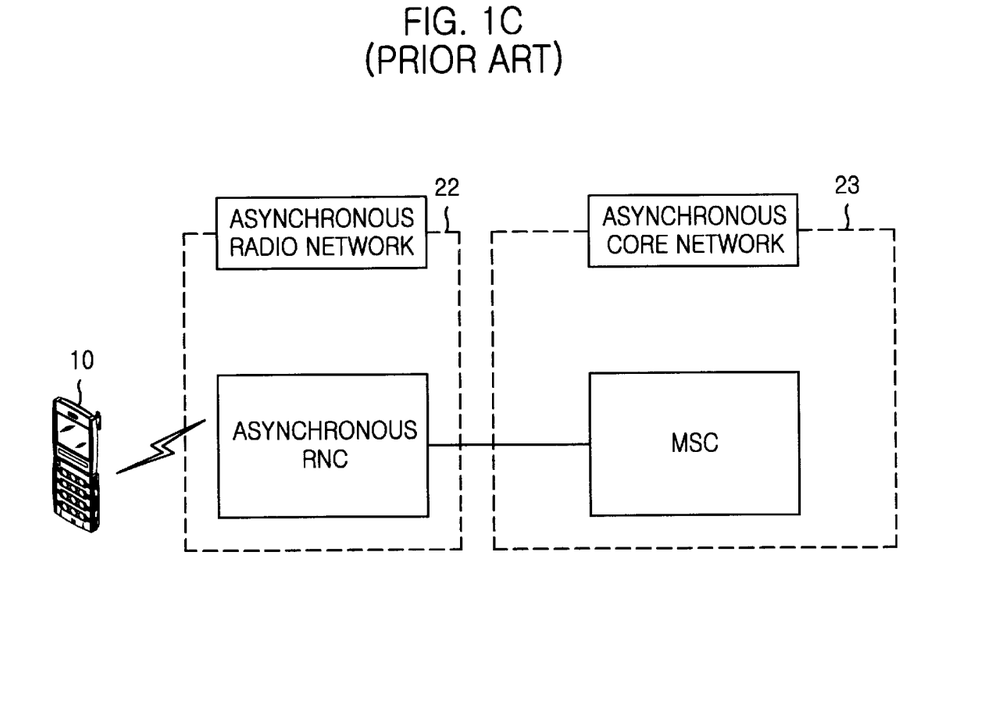
Figure 1D:
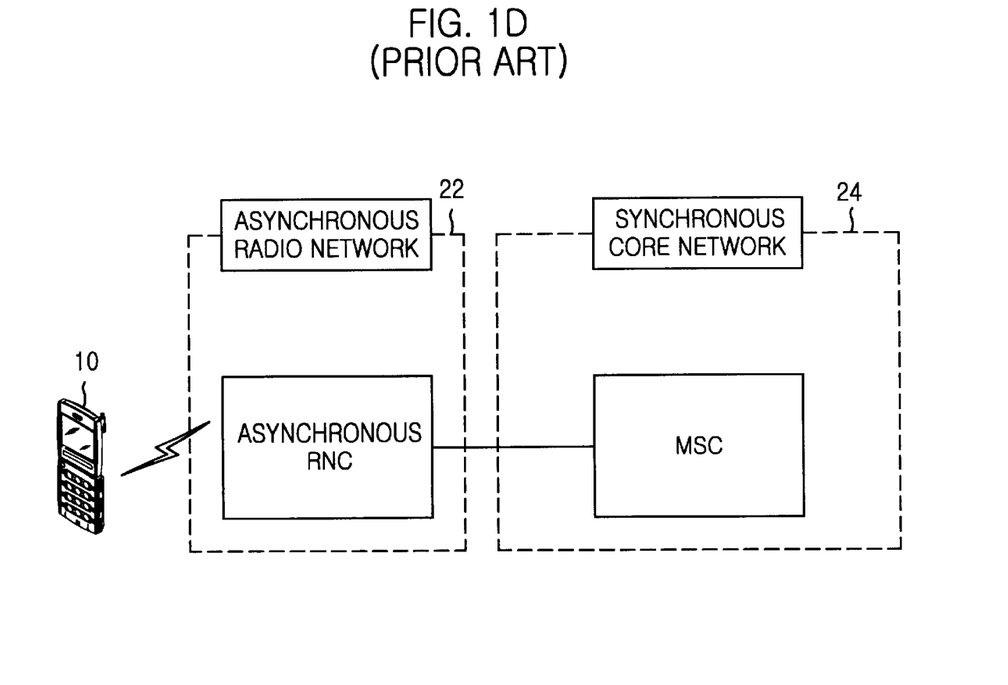

In case of FIG. 1D, however, there are differences between the Air-interface and the A-interface in a call control, a procedure of a handoff operation, kinds of messages and parameters, and the like. Therefore, an effective call control and handoff method is needed.

The handoff is an operation for assigning a new communication channel to a mobile station when the mobile station moves from one specific cell to another cell neighboring to the specific cell. In handoff techniques, there are a hard handoff and a soft handoff.

When a mobile station moves from one cell to another cell, the hard handoff is achieved by breaking a communication channel of one base station and then making a call connection to a communication channel of another base station. At this time, there may occur a phenomenon of a breaking of communication.

When a mobile station moves from one cell to another cell, the soft handoff is achieved by making a call connection to a communication channel of another base station and then breaking a communication channel of one base station.

When the mobile station communicating with an asynchronous base station moves to an area where there are no asynchronous base stations capable of providing a communication service to the mobile station, it is necessary to perform a handoff from a current asynchronous base station to a synchronous base station neighboring to the current asynchronous base station.

For performing the handoff of an asynchronous base station to neighboring synchronous base station, a mobile station should obtain information associated with the synchronous base station, such as a pilot offset of the neighboring synchronous base station, a superframe timing of a Sync channel, a long code state, and the like. Also, in order to minimize a phenomenon of an undesirable breaking of communication, the mobile station should obtain the information before a compressed mode.

The pilot channel of entire synchronous base stations employs one short code having a length of $2^{15}$ chips (26.667 ms), and each synchronous base station are identified according to corresponding pilot offset of the pilot channel. Therefore, for searching for the pilot channel during the compressed mode, a total period of 26.677 ms should be searched, thereby causing a waste of time.

Additionally, for obtaining the pilot offset and the long code state of the traffic channel, the Sync channel needs to be decoded. Since the superframe of the Sync channel has a period of 80 ms, however, it takes much time to perform the handoff from the asynchronous base station to the synchronous base station.

Furthermore, in case where the mobile station does not obtain the information associated with the neighboring synchronous base station, the mobile station cannot immediately perform a power monitoring operation when the mobile station receives a power monitoring command from the asynchronous base station. As a result, the mobile station performs an initial cell searching operation in order to obtain information associated with neighboring synchronous base stations. However, it takes much time to perform the initial cell searching operation, thereby causing a phenomenon of an undesirable breaking of communication.

SUMMARY OF THE INVENTION

It is, therefore, an object of the present invention to provide a mobile telecommunication system for performing a handoff from an asynchronous communication system to a synchronous communication system by using information associated with a neighboring synchronous base station.

It is another object of the present invention to provide a method for performing a handoff from the asynchronous communication system to the synchronous communication system by using information associated with a neighboring synchronous base station.

In accordance with an aspect of the present invention, there is provided a mobile telecommunication system for performing a handoff from an asynchronous communication system to a synchronous communication system, comprising: at least one asynchronous base station; at least one synchronous base station neighboring to the asynchronous base station, wherein the synchronous base station transmits channel signals; at least one dual-mode mobile station for selectively communicating with the synchronous base station and the asynchronous base station; and a reception means, coupled to the asynchronous base station, for receiving and decoding the channel signals to transmit decoded signals to the asynchronous base station, wherein the asynchronous base station transmits the decoded signals to the dual-mode mobile station, thereby performing a handoff operation.

In accordance with another aspect of the present invention, there is provided a method for performing a handoff from an asynchronous communication system to a synchronous communication system in a mobile telecommunication system, wherein the mobile telecommunication system includes an asynchronous base station, a synchronous base station neighboring to the asynchronous base station, the synchronous base station transmitting channel signals, a dual-mode mobile station for selectively communicating with the synchronous base station and the asynchronous base station, and a reception means, coupled to the asynchronous base station, for receiving and decoding the channel signals to transmit decoded signals to the asynchronous base station, the method comprising the steps of: a) receiving the channel signals; b) communicating with the dual-mode mobile station operating in an asynchronous mode; c) searching neighboring asynchronous base stations to be handed off; d) if there is no neighboring asynchronous base station to be handed off, transmitting a power monitoring command to the dual-mode mobile station; e) transmitting decoded signals to the dual-mode mobile station; f) performing a power monitoring operation and report monitored result to the asynchronous base station; and g) performing a handoff to the synchronous base station.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 2A:
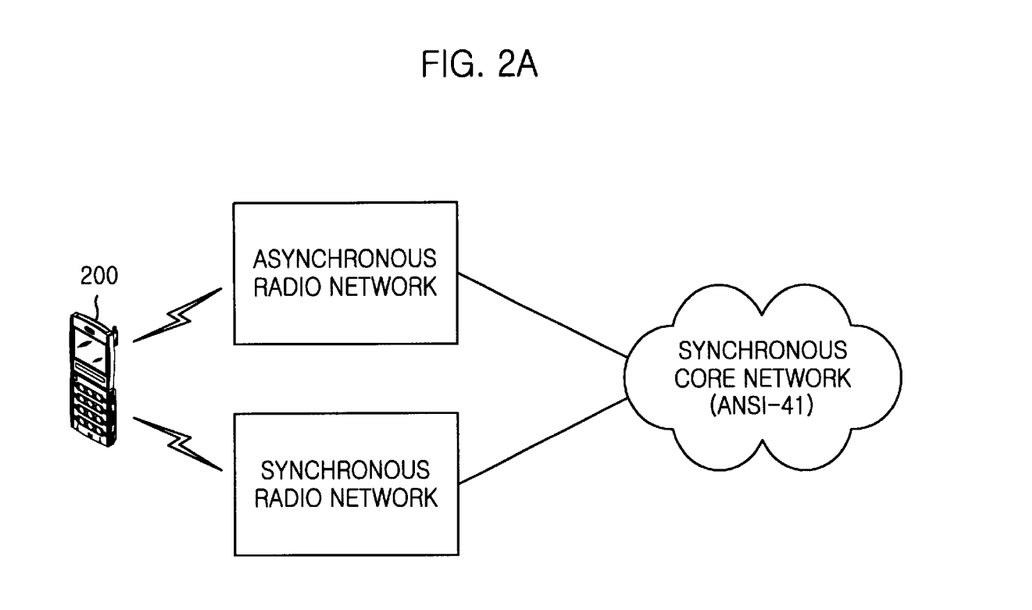
FIGS. 2A and 2B are views illustrating a handoff from an asynchronous base station to a synchronous base station.
Figure 2B:
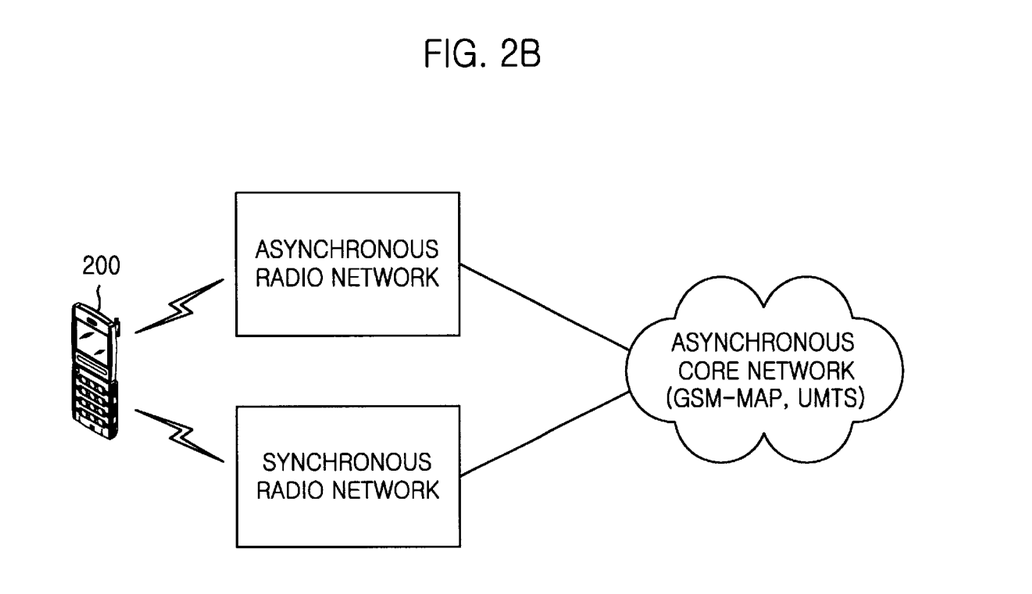

FIGS. 2A and 2B are views illustrating a handoff from an asynchronous base station to a synchronous base station in accordance with the present invention.

For performing a handoff from an asynchronous base station such as a wideband code division multiple access (W-CDMA) to a synchronous base station, neighboring to the asynchronous base station, based on IS-95 or IS-2000, a dual-mode mobile station should obtain information associated with the synchronous base station.

For the sake of convenience, although a mobile telecommunication system includes a plurality of mobile stations, a plurality of asynchronous base stations, a plurality of synchronous base stations, the present invention will be described with a mobile telecommunication system including one mobile station, one asynchronous base station and one neighboring synchronous base station.

Figure 3:
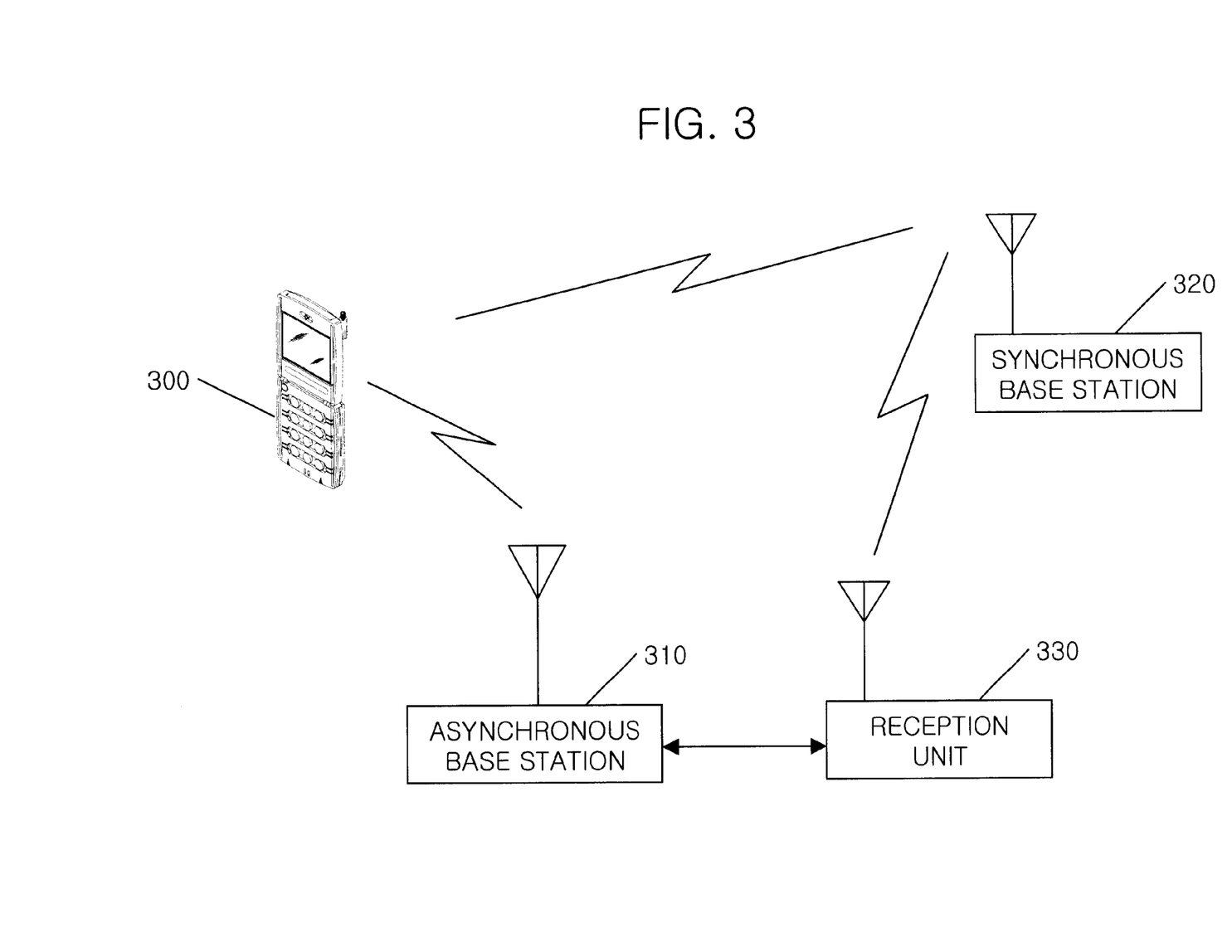
FIG. 3 is a schematic diagram illustrating a mobile telecommunication system using a reception unit for receiving information associated with a synchronous base station in accordance with an embodiment of the present invention.

FIG. 3 is a schematic diagram illustrating a mobile telecommunication system having a reception unit for receiving information associated with a synchronous base station in accordance with an embodiment of the present invention. A reference numeral 300 presents a dual-mode mobile station that can selectively communicate with the asynchronous base station and the synchronous base station.

Referring to FIG. 3, the mobile telecommunication system according to the present invention includes a dual-mode mobile station 300, an asynchronous base station 310, a reception unit 330 coupled to the asynchronous base station 310, and a synchronous base station 320 neighboring to the asynchronous base station 310.

The reception unit 330 according to the present invention can be implemented with an extended receiver such as a synchronous system signal receiver or a global positioning system (GPS) signal receiver.

In case where the extended receiver such as the synchronous system signal receiver is used, the extended receiver receives and decodes a pilot signal and a Sync signal transmitted from the synchronous base station 320 and obtains the information associated with the synchronous base station 320. Here, the information includes a neighbor list, a long code state, time related information such as an absolute time of the synchronous base station, and the like. Then, the information associated with the synchronous base station 320 is transmitted to the asynchronous base station 310.

In case where the GPS signal receiver is used as the reception unit, the GPS signal receiver receives a GPS signal from a GPS satellite and calculates the time related information, including an absolute time, and the long code state. Then, the time related information and the long code state are transmitted to the asynchronous base station 310. At this time, the neighbor list associated with synchronous base station is informed from the core network connected with asynchronous base station because the neighbor list cannot be generated based on the GPS signal When performing a handoff from the asynchronous base station 310 to the synchronous base station 320, the asynchronous base station 310 transmits the time related information, the neighbor list and the long code state to the dual-mode mobile station 300 communicating with the asynchronous base station 310. Preferably, the time related information, the neighbor list and the long code state can be transmitted over a broadcasting signal, a phasing signal, or a dedicated signal.

Figure 4:
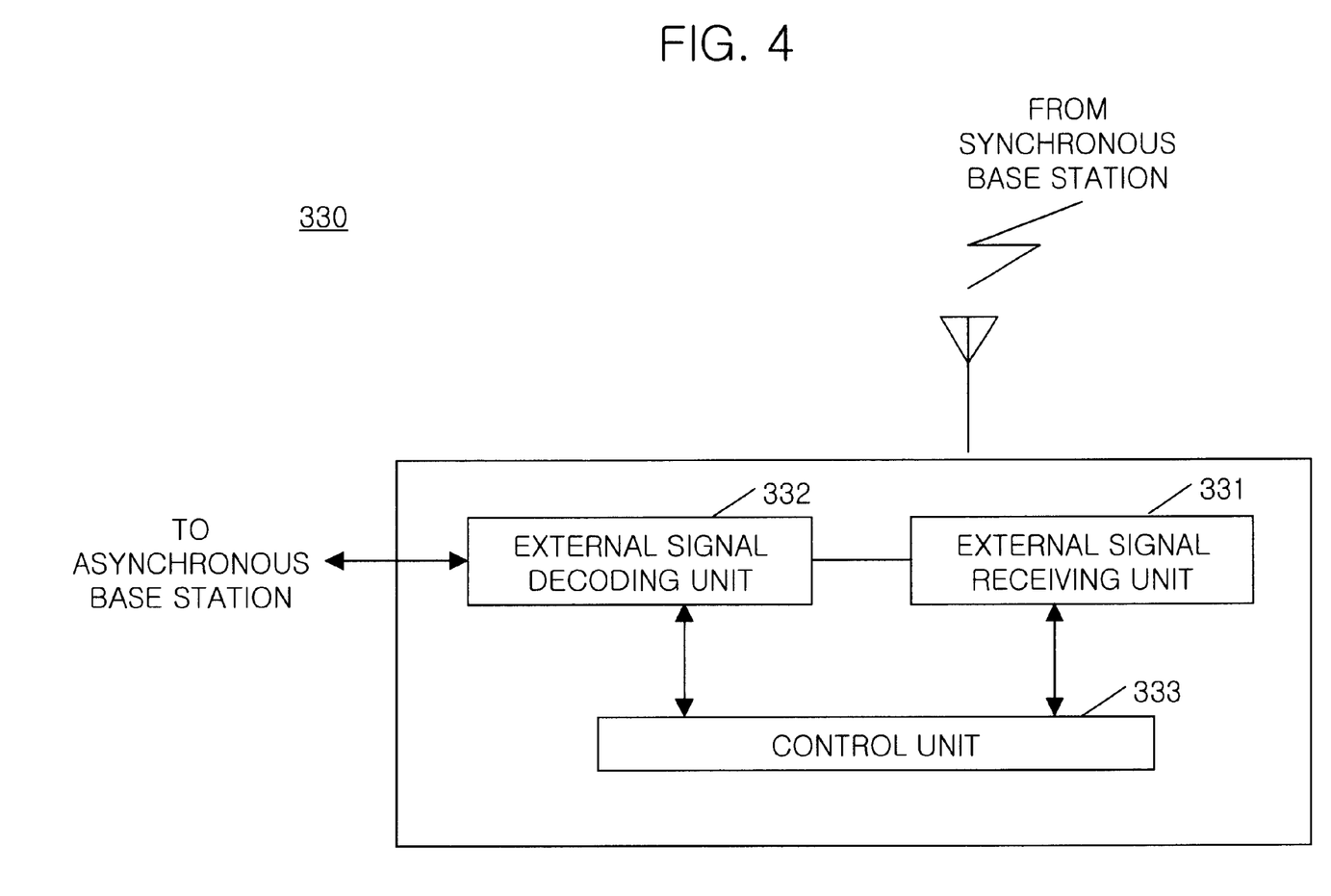
FIG. 4 is a block diagram illustrating a reception unit in accordance with an embodiment of the present invention.

FIG. 4 is a block diagram illustrating the reception unit in accordance with an embodiment of the present invention.

Referring to FIG. 4, the reception receiver includes an external signal receiving unit 331, an external signal decoding unit 332 and a control unit 333.

First, in case where an extended receiver is used, the external signal receiving unit 331 receives the pilot signal and the Sync signal transmitted from the synchronous base station 320.

The external signal decoding unit 322 decodes the pilot signal and the Sync signal to obtain the information associated with the synchronous base station 320. At this time, the information includes the time related information such as the absolute time of the synchronous base station 320, the neighbor list and the long code state. The information then is transmitted to the asynchronous base station 310.

The control unit 333 controls a status or an operation of the external signal receiving unit 331 and the external signal decoding unit 332 in response to a control signal transmitted from the asynchronous base station 310.

After obtaining the absolute time of the synchronous base station 320, the asynchronous base station 310 performs an initialization operation for setting up an absolute time of the asynchronous base station.

Figure 5:
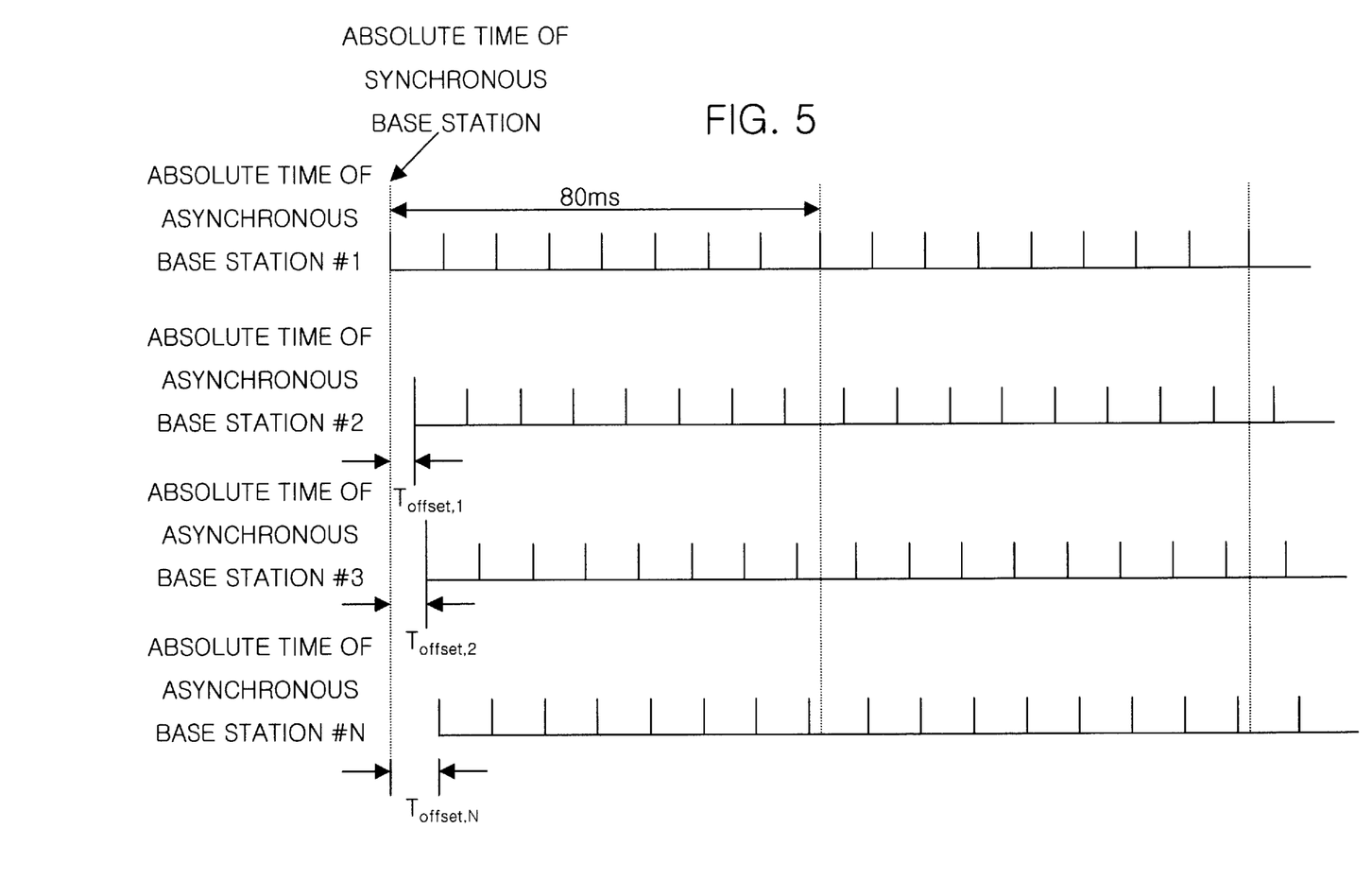
FIG. 5 is a timing chart of absolute times with respect to asynchronous base stations in accordance with the present invention.

Hereinafter, the initialization operation will be described in detail with reference to FIGS. 4 and 5.

First, an asynchronous base station initially receives an offset time ($T_{offset,i}$) through an asynchronous system initialization message from an upper layer. Each of asynchronous base stations has offset time ($T_{offset,i}$) different from each other. Furthermore, the offset time ($T_{offset,i}$) is an arbitrary value except for a value corresponding to N times of chips per slot, wherein the chips per slot is a value defined in the asynchronous communication system, N being an integer.

Next, the asynchronous base station obtains an absolute time of neighboring synchronous base station and the obtained absolute time is used to set up as a reference time (T) of the asynchronous base station. Here, the absolute time (t) plays a role as a standard time applicable to all the signals when the asynchronous base station transmits signals to the mobile station. Meanwhile, the reference time plays an auxiliary role in determining the absolute times.

Then, an absolute time (t) of the asynchronous base station is set up by using the offset time ($T_{offset,i}$) and the reference time (T). The absolute time (t) is expressed as follows:

$$t_i = T + T_{offset,i} \quad \text{(EQ. 1)}$$

where, i is an integer, $t_i$ is an absolute time of i-th asynchronous base station, T is a reference time of an asynchronous base station, $T_{offset,i}$ is an offset time designated from an upper layer.

In case where a global positioning system (GPS) signal receiver is used, an external signal receiving unit 331 receives a GPS signal from a GPS satellite. An external signal decoding unit 332 decodes the GPS signal to obtain a long code state and a time related information of the synchronous base station, wherein the long code state and the time related information are transmitted to the asynchronous base station. A control unit 333 controls a status and an operation of the external signal receiving unit 331 and the external signal decoding unit 332 in response to a control signal outputted from the asynchronous base station 310.

At this time, a neighbor list is informed from a core network connected with the asynchronous base station.

When it is necessary to perform a handoff from the asynchronous base station to the synchronous base station, the asynchronous base station transmits a power monitoring command and the obtained information to the dual-mode mobile station. At this time, it is possible to perform a power monitoring operation to the synchronous base station by using the information transmitted from the asynchronous base station.

Hereinafter, as an embodiment of the present invention, a method for transmitting the information associated with the synchronous base station from the asynchronous base station to a dual-mode mobile station.

Generally, it takes about 240 ms to obtain a long code state by decoding the Sync channel. Thus, it is impossible to decode the Sync channel during a compressed mode. Furthermore, since the long code state is a kind of information varying with time, the long code state should be transmitted to the mobile station at an exact time.

Figure 6:
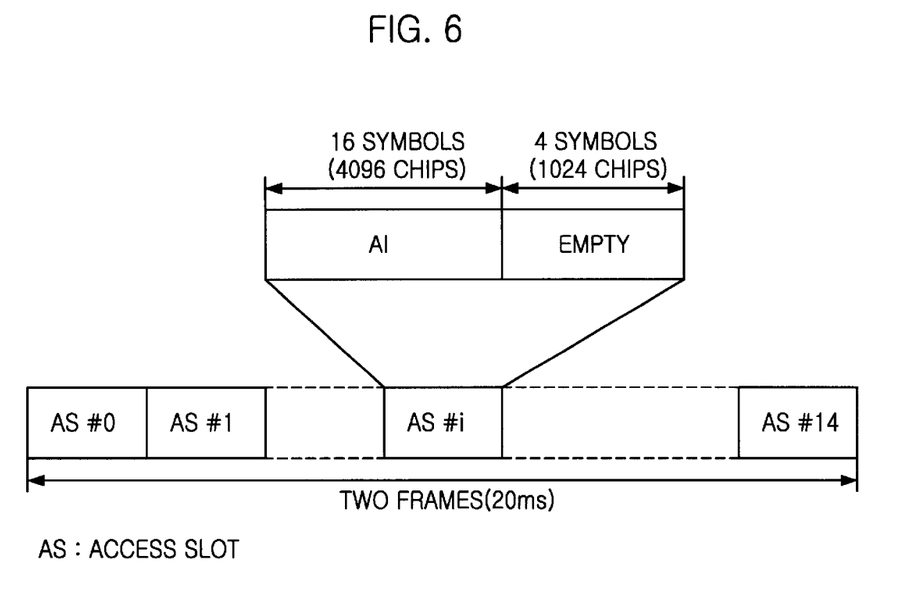
FIG. 6 is a diagram illustrating a structure of an acquisition indicator channel (AICH) to be used for transmitting a long code state.
Figure 7:
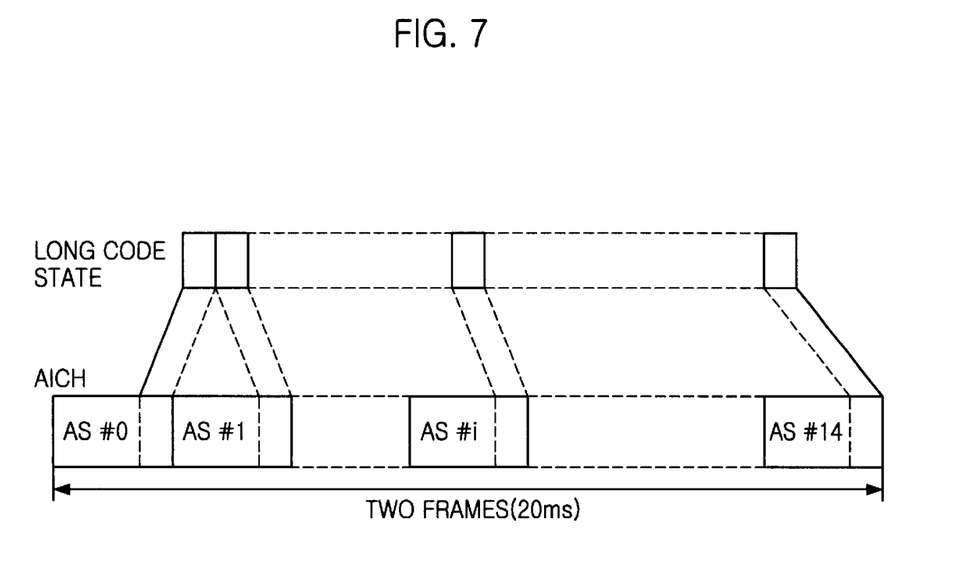
FIG. 7 is a diagram illustrating a transmission of a long code state by using an acquisition indicator channel (AICH) in accordance with an embodiment of the present invention.

FIG. 6 is a diagram illustrating a structure of an acquisition indicator channel (AICH) to be used in transmitting a long code state. FIG. 7 is a diagram illustrating a method for transmitting a long code state by using an AICH in accordance with an embodiment of the present invention.

An AICH has the same frame timing as a primary common control physical channel (PCCPCH), so that it is possible to transmit the long code state to the dual-mode mobile station.

As shown in FIG. 6, the AICH has 15 access slots (AS) in two frames. In case where a spreading factor (SF) is of 256, the AICH has four unused bits in every access slot so that sixty unused bits are obtained in two frames.

Accordingly, the long code state can be transmitted over the AICH. Furthermore, a frame quality indicator such as a cyclic redundancy check (CRC) code of twelve bits can be also inserted into the AICH. The CRC code is used to check whether the long code state is correctly transmitted. As a result, the dual-mode mobile station can correctly obtain the long code state during 15 access slots of the AICH.

Figure 8:
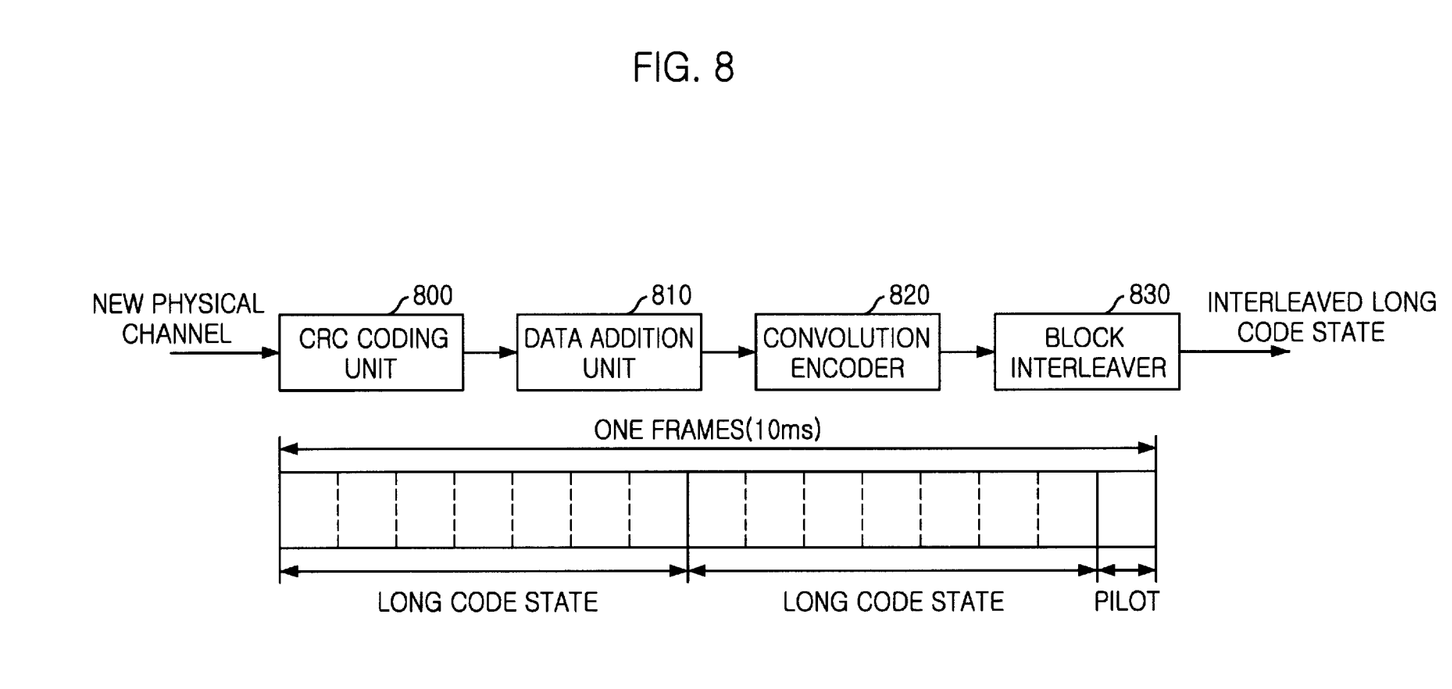
FIG. 8 is a diagram illustrating a structure of a new physical channel to be used for transmitting a long code state in accordance with an embodiment of the present invention.

FIG. 8 is a diagram illustrating a method for transmitting a long code state by using a new physical channel in accordance with another embodiment of the present invention.

As shown, a new physical channel according to the present invention includes two long code state portions and one pilot portion. At this time, the pilot portion is used as a reference when decoding the long code state portions.

A CRC coding unit 800 receives a long code state of 50 bits through the new physical channel, and adds a CRC code of 12 bits. Then, the CRC coding unit performs a CRC coding operation to output a CRC-coded data of 62 bits.

A data addition unit 810 receives the CRC-coded data and adds data of 8 bits in a tail portion of the CRC-coded data to output a data of 70 bits.

A convolution encoder 820 performs a convolution encoding to the data of 70 bits to output a data of 140 bits.

A block interleaving unit 830 performs an interleaving operation to the data of 140 bits to output an interleaved long code state to the dual-mode mobile station.

The processed long code state is transmitted through the new physical channel after repeating the above-described procedure two times.

The new physical channel has the same frame timing as the PCCPCH. Furthermore, by using a relationship between the frame timing of the new physical channel and timings of the asynchronous and the synchronous base stations, the dual-mode mobile station can determines timing when the long code state is used.

Figure 9:
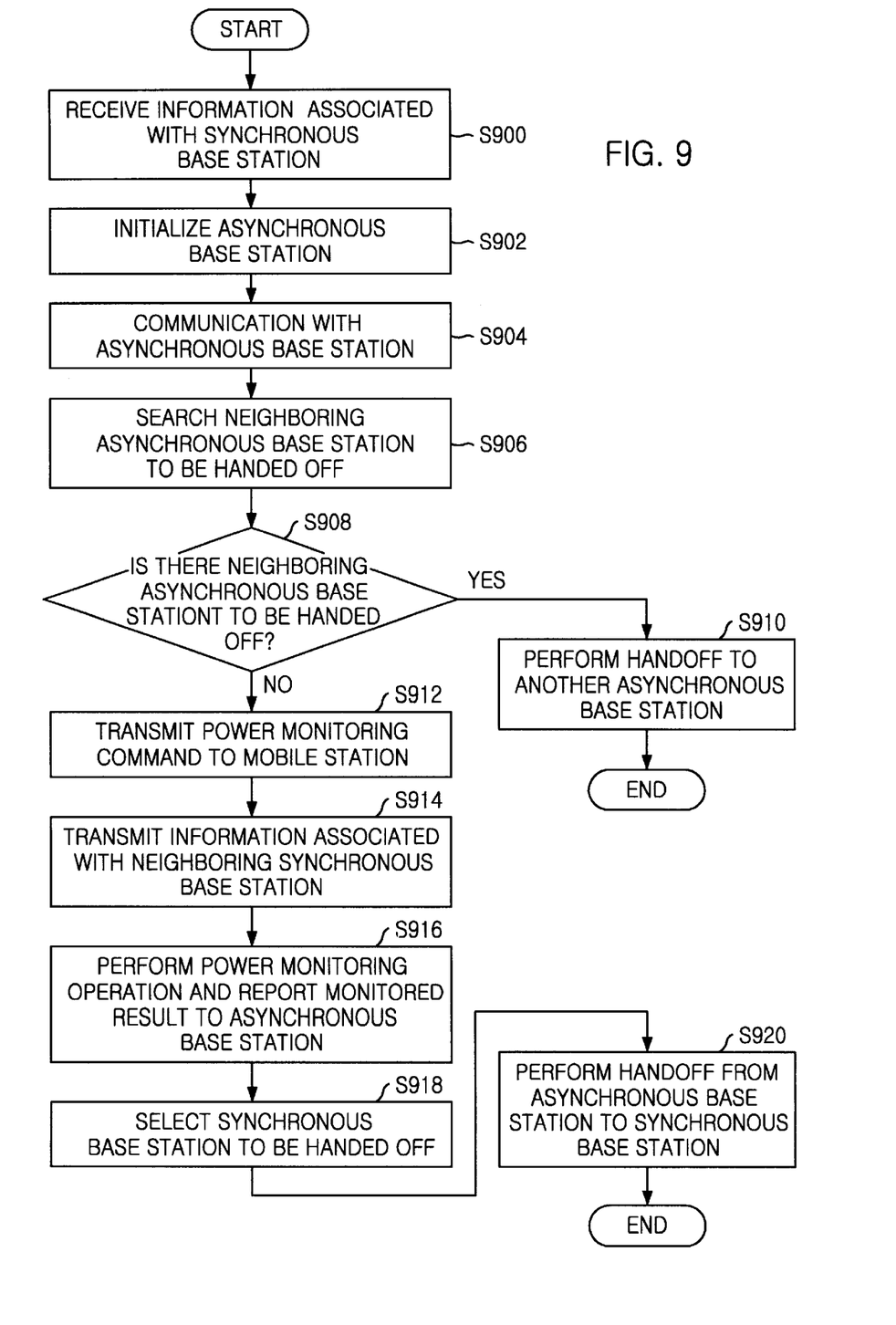
FIG. 9 is a flow chart illustrating a method for performing a handoff from an asynchronous base station to a neighboring synchronous base station in accordance with the present invention.

FIG. 9 is a flow chart illustrating a method for performing a handoff from an asynchronous base station to a neighboring synchronous base station in accordance with the present invention.

Referring to FIG. 9, at step S900, an asynchronous base station that communicates with a dual-mode mobile station receives information associated with neighboring synchronous base station through a reception unit that is coupled to the asynchronous base station. The reception unit is implemented with one of a GPS signal receiver and an extended receiver such as a synchronous system signal receiver.

The extended receiver decodes a pilot signal and a Sync signal transmitted from the synchronous base station, thereby obtaining the information associated with the synchronous base station. The information includes a neighbor list, a long code state, and a time related information including an absolute time of the synchronous base station.

In case where the GPS signal receiver is used, the GPS signal receiver receives a GPS signal and obtains the information associated with the synchronous base station, such as an absolute time and a long code state. The neighbor list associated with synchronous base station is informed from the core network connected with asynchronous base station because the neighbor list cannot be generated based on the GPS signal.

At step S902, the asynchronous base station performs an initialization operation for setting up its own absolute time by using the absolute time of the synchronous base station. Concretely, the asynchronous base station receives an offset time from an upper layer over an asynchronous system initialization message. At this time, each of asynchronous base stations has different offset times from each other. The offset time is an arbitrary value except for a value corresponding to N times of chips per slot, wherein the chips for slot is assigned to the asynchronous base station, N being an integer.

Then, after obtaining the absolute time of neighboring synchronous base station, the asynchronous base station sets up the absolute time of the neighboring synchronous base station as its own reference time. An absolute time of the asynchronous base station is set up as follows:

$$t_i = T + T_{offset,i} \quad (EQ. 2)$$

where, i is an integer, $t_i$ is an absolute time of i-th asynchronous base station, T is a reference time of an asynchronous base station, $T_{offset,i}$ is an offset time designated from an upper layer.

As can be seen, respective asynchronous base stations have the same reference time each other and difference absolute time from each other.

At step S904, the dual-mode mobile station communicates with the asynchronous base station.

At step S906, when it is necessary to perform a handoff, the asynchronous base station transmits to the dual-mode mobile station a message of searching neighboring asynchronous base station to be handed off. The dual-mode mobile station searches neighboring asynchronous base stations and transmits searched result to the asynchronous base station.

At step S908, the asynchronous base station determines whether or not there is an asynchronous base station to be handed off.

At step S910, if there is an asynchronous base station to be handed off, the asynchronous base station performs a handoff to the corresponding asynchronous base station.

At step S912, if there is no asynchronous base station to be handed off, the asynchronous base station transmits a power monitoring command to the dual-mode mobile station in a form of a radio resource control (RRC) message.

At step S914, the asynchronous base station also transmits the information associated with the neighboring synchronous base station to the dual-mode mobile station. The information includes the neighbor list, the long code state, and time related information. Furthermore, the information associated with the synchronous base station is transmitted over a broadcasting signal, phasing signal, or a dedicated signal.

Figure 10:
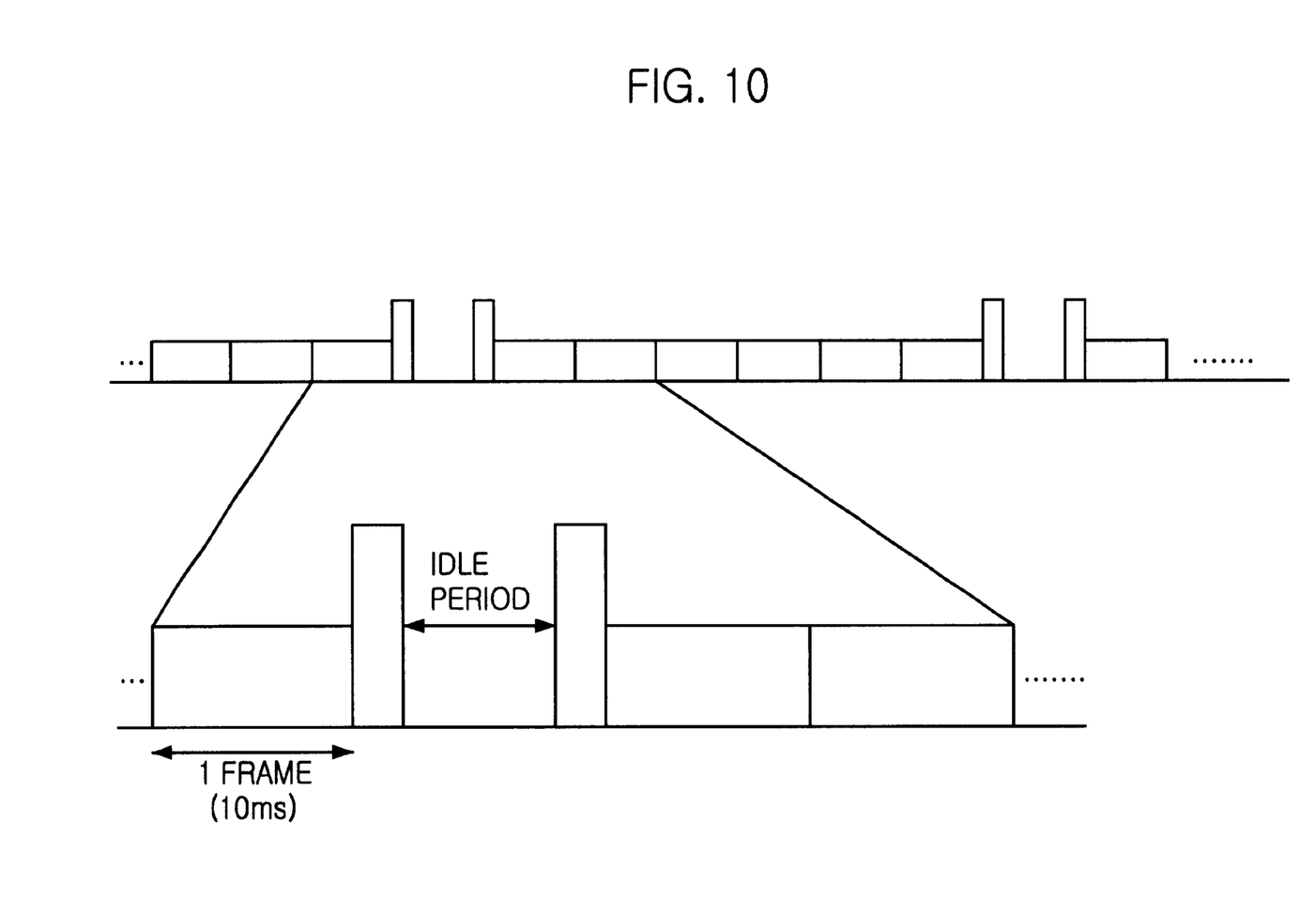
FIG. 10 is a diagram illustrating a structure of a compressed mode.

At step S916, after receiving the power monitoring command and the information associated with the synchronous base station, the dual-mode mobile station performs a power monitoring operation with respect to neighboring synchronous base stations and reports a monitored result to the asynchronous base station. At this time, the power monitoring operation is performed during a compressed mode. As shown in FIG. 10, the compressed mode has an idle period. The dual-mode mobile station obtains a zero offset timing and searches a pilot offset having a maximum output values in the neighbor list. Then, the searched result is reported to the asynchronous base station. The message of the searched result can be transmitted in a form of a pilot strength measurement message.

At step 918, by analyzing the searched result transmitted from the dual-mode mobile station, the asynchronous base station selects one synchronous base station to be handed off by using a pilot channel signal having a maximum value.

At step S920, a handoff from the asynchronous base station to the selected synchronous base station is performed. That is, the asynchronous base station transmits a handoff required message to a core network and the core network transmits a handoff request message to the synchronous base station to be handed off.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile telecommunication system for performing a handoff from an asynchronous communication system to a synchronous communication system, comprising:

at least one asynchronous base station;

at least one synchronous base station neighboring to the asynchronous base station, wherein the synchronous base station transmits channel signals;

at least one dual-mode mobile station for selectively communicating with the synchronous base station and the asynchronous base station; and a reception means, coupled to the asynchronous base station, for receiving and decoding the channel signals to transmit decoded signals to the asynchronous base station, wherein the asynchronous base station transmits the decoded signals to the dual-mode mobile station, thereby performing a handoff operation.

2. The mobile telecommunication system as recited in claim 1, wherein the asynchronous base station is a wideband code division multiple access (W-CDMA) telecommunication system.

3. The mobile telecommunication system as recited in claim 1, wherein the synchronous base station is one of 2 generation (2G) system based on IS-95 and 3 generation (3G) system based on IS-2000.

4. The mobile telecommunication system as recited in claim 1, wherein the reception means is an extended receiver, the extended receiver including:
an external signal receiving means for receiving a pilot signal and a Sync signal transmitted from the synchronous base station;
an external signal decoding means for decoding the pilot signal and the Sync signal transmitted from the external signal receiving means, to output decoded signals to the asynchronous base station, wherein the decoded signals include a long code state, a neighbor list, and a time related information of the synchronous base station; and
a control means for controlling a status and an operation of the external signal receiving means and the external signal decoding means in response to a control signal outputted from the asynchronous base station.

5. The mobile telecommunication system as recited in claim 1, wherein the reception means is a global positioning system (GPS) signal receiver, the global positioning system (GPS) signal receiver including:
an external signal receiving means for receiving a GPS signal from a GPS satellite;
an external signal decoding means for decoding the GPS signal to obtain a long code state and a time related information of the synchronous base station, wherein the long code state and the time related information are transmitted to the asynchronous base station; and
a control means for controlling a status and an operation of the external signal receiving means and the external signal decoding means in response to a control signal outputted from the asynchronous base station.

6. The mobile telecommunication system as recited in claim 5, wherein a neighbor list is informed from a core network connected with the asynchronous base station.

7. The mobile telecommunication system as recited in claim 1, wherein the decoded signals are transmitted to the dual-mode mobile station over one of a broadcasting signal, a phasing signal, and a dedicated signal.

8. The mobile telecommunication system as recited in claim 7, wherein the dual-mode mobile station searches neighboring synchronous base station to be handed off by using the decoded signals.

9. The mobile telecommunication system as recited in claim 1, wherein the asynchronous base station transmits a long code state to the dual-mode mobile station over an acquisition indicator channel (AICH).

10. The mobile telecommunication system as recited in claim 9, wherein the acquisition indicator channel (AICH) includes 15 access slots in 2 frames, each slot having 4 unused bits.

11. The mobile telecommunication system as recited in claim 10, wherein the information of the long code state is inserted into the acquisition indicator channel (AICH) with a cyclic redundancy check (CRC) code of 12 bits.

12. The mobile telecommunication system as recited in claim 1, wherein the asynchronous base station transmits a long code state over a physical channel, the physical channel including a first portion for transmitting a pilot signal one time and a second portion for transmitting the long code state two times.

13. The mobile telecommunication system as recite in claim 1, wherein neighboring asynchronous base stations have different absolute times from each other.

14. The mobile telecommunication system as recited in claim 13, wherein the absolute times of the neighboring asynchronous base stations is as follows:

$$t_i = T + T_{offset,i}$$

where, i is an integer,
$t_i$ is an absolute time of i-th asynchronous base station,
T is a reference time of an asynchronous base station, and
$T_{offset,i}$ is an offset time designated from an upper layer, wherein the offset time is an arbitrary value except for a value corresponding to N times of chips per slot assigned to the asynchronous base station, N being an integer.

15. A method for performing a handoff from an asynchronous communication system to a synchronous communication system in a mobile telecommunication system, wherein the mobile telecommunication system includes at least one asynchronous base station; at least one synchronous base station neighboring to the asynchronous base station, wherein the synchronous base station transmits channel signals; at least one dual-mode mobile station for selectively communicating with the synchronous base station and the asynchronous base station; and a reception means, coupled to the asynchronous base station, for receiving and decoding the channel signals to transmit decoded signals to the asynchronous base station, wherein the asynchronous base station transmits the decoded signals to the dual-mode mobile station, the method comprising the steps of:
a) receiving the channel signals;
b) communicating with the dual-mode mobile station operating in an asynchronous mode;
c) searching neighboring asynchronous base stations to be handed off;
d) if there is no neighboring asynchronous base station to be handed off, transmitting a power monitoring command to the dual-mode mobile station;
e) transmitting decoded signals to the dual-mode mobile station;
f) performing a power monitoring operation and report monitored result to the asynchronous base station; and
g) performing a handoff to the synchronous base station.

16. The method as recited in claim 15, further, after the step a), comprising the step of:
h) performing an initialization for setting up an absolute time of the asynchronous base station.

17. The method as recited in claim 16, wherein the step h) includes the steps of:
h1) receiving an offset time from an upper layer, wherein each of asynchronous base stations has different offset times from each other, and wherein the offset time is an arbitrary value except for a value corresponding to N times of chips per slot, N being an integer;
h2) obtaining an absolute time of neighboring synchronous base station; and
h3) setting up the absolute time of the asynchronous base station by using the absolute time of the neighboring synchronous base station and the offset time.

18. The method as recited in claim 17, wherein each absolute time of asynchronous base stations is as follows:

$$t_i = T + T_{offset,i}$$

where, i is an integer,
$t_i$ is an absolute time of i-th asynchronous base station,
T is a reference time of an asynchronous base station, and
$T_{offset,i}$ is an offset time designated from an upper layer.

19. The method as recited in claim 15, if there is a synchronous base station to be handed off, further comprising the step of performing a handoff to corresponding synchronous base station to be handed off.

20. The method as recited in claim 15, wherein the step f) includes the steps of:
   f1) transmitting a power monitoring command and the information associated with the synchronous base station from the asynchronous base station to the dual-mode mobile station;
   f2) obtaining a power of a pilot channel of synchronous base stations in the neighbor list; and
   f3) reporting the pilot offset to the asynchronous base station.

21. The method as recited in claim 20, wherein the power monitoring operation is performed during a compressed mode.

22. The method as recited in claim 15, wherein the step g) is performed by selecting one synchronous base station to be handed off by using a pilot channel signal having a maximum value.

23. The method as recited in claim 15, wherein the step g) includes the steps of:
   g1) transmitting a handoff required message to a core network; and
   g2) transmitting a handoff request message to the synchronous base station to be handed off.

24. The method as recited in claim 15, wherein the asynchronous base station is a wideband code division multiple access (W-CDMA) telecommunication system.

25. The method as recited in claim 15, wherein the synchronous base station is one of 2 generation (2G) system based on IS-95 and 3 generation (3G) system based on IS-2000.

26. The method as recited in claim 15, wherein the reception means is an extended receiver, the extended receiver including:
   an external signal receiving means for receiving a pilot signal and a Sync signal transmitted from the synchronous base station;
   an external signal decoding means for decoding the pilot signal and the Sync signal transmitted from the external signal receiving means, to output decoded signals to the asynchronous base station, wherein the decoded signals include a long code state, a neighbor list, and a time related information of the synchronous base station; and
   a control means for controlling a status and an operation of the external signal receiving means and the external signal decoding means in response to a control signal outputted from the asynchronous base station.

27. The method as recited in claim 15, wherein the reception means is a global positioning system (GPS) signal receiver, the global positioning system (GPS) signal receiver including:
   an external signal receiving means for receiving a GPS signal from a GPS satellite;
   an external signal decoding means for decoding the GPS signal to obtain a long code state and a time related information of the synchronous base station, wherein the long code state and the time related information are transmitted to the asynchronous base station; and
   a control means for controlling a status and an operation of the external signal receiving means and the external signal decoding means in response to a control signal outputted from the asynchronous base station.

28. The method as recited in claim 27, wherein the asynchronous base station obtains a neighbor list associated with synchronous base station from a core network connected with asynchronous base station.

29. The method as recited in claim 15, wherein the decoded signals are transmitted to the dual-mode mobile station over one of a broadcasting signal, a phasing signal, and a dedicated signal.

30. The method as recited in claim 29, wherein the dual-mode mobile station searches neighboring synchronous base station to be handed off by using the decoded signals.

31. The method as recited in claim 15, wherein the asynchronous base station transmits a long code state to the dual-mode mobile station over an acquisition indicator channel (AICH).

32. The method as recited in claim 31, wherein the acquisition indicator channel (AICH) includes 15 access slots in 2 frames, each slot having 4 unused bits.

33. The method as recited in claim 32, wherein the information of the long code state is inserted into the acquisition indicator channel (AICH) with a cyclic redundancy check (CRC) code of 12 bits.

34. The method as recited in claim 33, wherein the asynchronous base station transmits a long code state over a physical channel, the physical channel including a first portion for transmitting a pilot signal one time and a second portion for transmitting the long code state two times.

35. The method as recited in claim 34, wherein a method for transmitting the long code state over the physical channel includes the steps of:
   h) receiving a long code state of 50 bits through the physical channel, and adding a CRC code of 12 bits;
   i) performing a CRC coding operation to output a CRC-coded data of 62 bits;
   j) receiving the CRC-coded data and adding data of 8 bits in a tail portion of the CRC-coded data to output a data of 70 bits;
   k) performing a convolution encoding to the data of 70 bits to output a data of 140 bits;
   l) performing an interleaving operation to the data of 140 bits to output an interleaved long code state to the dual-mode mobile station; and
   m) repeating the steps h) to l) two times.

* * * * *